(12) United States Patent
McDermott (10) Patent No.: US 7,259,787 B2
(45) Date of Patent: Aug. 21, 2007

(54) DIGITAL BLACK CLAMP CIRCUIT IN ELECTRONIC IMAGING SYSTEMS

(75) Inventor: Bruce C. McDermott, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1058 days.

(21) Appl. No.: 10/400,783

(22) Filed: Mar. 27, 2003

(65) Prior Publication Data

US 2004/0189839 A1 Sep. 30, 2004

(51) Int. Cl.
H04N 9/64 (2006.01)
(52) U.S. Cl. ..................................... 348/243
(58) Field of Classification Search ............... 348/241, 348/243–245, 222.1; 382/270–273
See application file for complete search history.

(56) References Cited

U.S. PATENT DOCUMENTS

| 4,562,471 A | 12/1985 | Eouzan et al. | |
| 5,270,819 A | 12/1993 | Watson | |
| 5,512,947 A | 4/1996 | Sawachi et al. | |
| 6,049,355 A | 4/2000 | Kameyama | |
| 6,587,144 B1 * | 7/2003 | Kim | 348/241 |
| 6,597,395 B1 | 7/2003 | Kim et al. | |
| 6,774,942 B1 * | 8/2004 | Salcedo et al. | 348/243 |
| 6,791,607 B1 * | 9/2004 | Bilhan et al. | 348/243 |
| 2002/0176009 A1 * | 11/2002 | Johnson et al. | 348/229 |

FOREIGN PATENT DOCUMENTS

DE  199 09 047 A1  3/2000
EP  0 710 011 A1  5/1996

OTHER PUBLICATIONS

Lattice Semiconductor Corporation, 24-Bit Adder Implementation in a CPLD, Aug. 2001, pp. 1-7.
Motorola, Inc., ⅓" Color VGA Digital Image sensor 640×480 pixel progressive/interlace scan solid state image sensor with integrated CDS/PGA/ADC, digital programming, control, timing, and pixel correction features, pp. 1-53, Nov. 2000.
Philips Semiconductors, 12-bit, 5.0 V, 30 Msps analog-to-digital interface for CCD cameras, pp. 1-23, Aug. 31, 2000.
Exar Corporation, XRD98L61 CCD Image Digitizers with CDS, PGA and 12-Bit A/D, pp. 1-34, May 2000.

* cited by examiner

*Primary Examiner*—Ngoc-Yen Vu
*Assistant Examiner*—Scott Egan
(74) *Attorney, Agent, or Firm*—Peyton C Watkins (57) ABSTRACT

The present invention is a black clamp circuit for an electronic imager having black reference pixels. The circuit includes an average value circuit determining an average of a number of the black reference pixels, a correction circuit determining the black level correction from the average, and a modifier circuit modifying image pixels with the black level. The average value is used in a real time feedback loop that removes offset errors in the signal processing chain and establishes a corrected black level in output image data. The feedback can be either digital or analog. The correction circuit can include a comparator that allows a hysteresis in the feedback to avoid hunting as well as multiple levels of feedback based on several thresholds. The corrected black level can also be controlled by a digital transfer function. The black clamp circuit can be used for a series of images, an image frame and an image line.

19 Claims, 5 Drawing Sheets

DIGITAL BLACK CLAMP CIRCUIT IN ELECTRONIC IMAGING SYSTEMS

FIELD OF THE INVENTION

The invention relates generally to the field of imaging, and in particular to black level clamping in digital sensor imaging. More specifically, the invention relates to a black clamp circuit that tracks the changes in black level (due to noise and dark current) and removes errors in the signal processing and does so in real time.

BACKGROUND OF THE INVENTION

Typically, a border of an image-sensing array, such as a Charge Coupled Device (CCD) imager or a CMOS imager, is surrounded with a number of rows and columns of light shielded, or black, pixels. These pixels provide black reference information or black pixel data to stabilize downstream image processing and establish the correct value for black in the output image. Charged Coupled Device Imager (CCD) and CMOS Imager signal processing chains have a need to establish and maintain the black reference in the signal processing chain.

The image-sensing array black pixel data contains a dark current signal, 1/f noise, KTC noise, and shot noise. The black pixel data also contain noise artifacts from imager pixel bright points, pixel dim points and column noise. All of these noise sources require filtering to obtain the correct black value for the image. An appropriate way to remove the noise sources from the black pixel values is to average a large quantity of them.

One component of the dark signal, or black pixel value, from an imager is dark current. CMOS Imager dark current typically doubles for every 10 degrees C. of substrate temperature increase. CCD Imager dark current typically doubles for every 6 degrees C. of substrate temperature increase. As the imager is operated, it heats up, due to its' internal power dissipation.

A "Black Clamp" circuit is typically used to establish the value of the black pixels in an image.

Prior art, Kodak Professional Electronic Cameras, such as the DCS-520, have utilized a black clamp that is a combination of hardware and software. The hardware exists as a digital-to-analog converter and a summing junction in the CCD signal-processing path. The software, executing on a microprocessor, calculates a real time average of the black pixels at the top of the image, it then uses a software look up table to determine the correct value to send to the digital-to-analog converter to establish the correct black correction. This solution requires the availability of the microprocessor and the microprocessor memory. This solution also consumes the power to run the microprocessor and the microprocessor machine cycles which are not available for other functions.

What is needed is a black clamp function that can be implemented on a substrate with the imager, one that uses less power and does not require the microprocessor or microprocessor memory.

What is also needed is a black clamp solution that "tracks" the changes in black level (due to noise and dark current) and removes offset errors in the signal processing and does so in real time.

In an electronic still camera that is capturing a series of sequential images (burst capture mode), the black signal from the imager is increasing as the imager continues to capture pictures. The heating of the imager substrate, due to power dissipation, causes the dark current to increase, increasing the black signal. It is appropriate to correct the black level at the beginning of each image in the series. This requires a real time feedback loop.

Typically, an analog black clamp circuit is utilized prior to a programmable gain stage (PGA) of a camera. Typically, the first stage black clamp takes the form of an integrator whose output is fed to a summing junction, prior to the PGA. This first stage black clamp can also take the form of a programmable offset circuit or a true feedback analog black pixel clamp. (Refer to the TDA9965 ((Philips Semiconductor, The Netherlands), XRD98L61 (EXAR Corp., Fremont, Calif.), and MCM20014 (Motorola, Inc., Denver, Colo.) data sheets). The first stage black clamp does not correct for residual errors that can be caused by the PGA and also does not correct for errors that are caused by the analog-to-digital (A/D) converter circuit appearing at a later stage. What is needed is a circuit that will correct for these errors.

The purpose of the first stage black clamp is to adjust the DC value of the black raw video signal to the "0" value of the Programmable Gain Amplifier (PGA) input. This is necessary because any offset error as input into the PGA is multiplied by the gain of the PGA. For example, a 31 db PGA gain setting corresponds to a 35× multiplication of the amplifier input. If there is a 100 milli-volt input signal (offset error, no black clamp) the amplifier output becomes 3.5 volts. A CMOS Imager typically uses 3.3 volts as its' power source. From this example it can be seen that the PGA will saturate, without using the actual imager video signal. Through this explanation it becomes obvious why the first stage black clamp circuit is necessary.

There are usually residual offset errors at the output of the PGA. These can be due to the PGA itself, and the first stage black clamp not performing "perfectly." There may be additional offset errors, which accumulate, introduced by each succeeding stage in the signal processing. For example, the analog-to-digital converter may have offset errors.

What is needed is a way to allow for these offset errors and correct for them at an analog-to-digital converter output with a second stage black feedback loop. What is needed is a system for removing these residual errors.

As discussed above, the first stage clamp is required to clamp at the "0" value of the PGA. This is a very tight requirement. What is needed is a way of relieving this performance requirement on the first stage black clamp. Instead of clamping exactly at "0" of the PGA, what is needed is a way of allowing the first stage clamp to get "close enough to 0."

As discussed above, a software-based solution to the black clamp problem can require unnecessary circuitry, such as memory chips, etc. It also uses valuable processor time. This consumes power and time. What is needed is an electronic circuit solution that is fast, so that it can operate in real time, and compact, so that its will allow for a more compact camera.

What is also needed, and something that is especially valuable when using this invention, is an integrated circuit solution in which the overall design becomes more process variation tolerant, leading to higher device production yield.

SUMMARY OF THE INVENTION

The present invention is directed to overcoming one or more of the problems set forth above. Briefly summarized, according to one aspect of the present invention, a black clamp circuit for an electronic imager having black reference pixels is provided with the circuit including an averaging apparatus determining an average of a number of the black reference pixels, a correction apparatus determining a black level from the average, and a modification apparatus modifying active image pixel values and black pixel values, of the same image, with the black level in a feedback loop. The invention utilizes a digital average value circuit to calculate the average value of a group of black pixels. The average value is then used in a real time feedback loop that removes offset errors in the signal processing chain and establishes a corrected black level in output image data. The feedback can be either digital or analog.

The above and other objects of the present invention will become more apparent when taken in conjunction with the following description and drawings wherein identical reference numerals have been used, where possible, to designate identical elements that are common to the figures.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the following advantages:

1. This invention operates independent of clock rate and will generate superior quality results as compared to prior art analog solutions to deriving the dark level. The solution of the invention finds the absolute digital average of the dark pixels (plus or minus one least significant bit, digital uncertainty) whereas the analog solution integrates the dark pixel values on a capacitor. This analog solution can only be optimized for one clock rate.
2. This invention uses a true average value for the derived black reference.
3. The quantity of pixels to be averaged can be made programmable. The noisier the black signal, the more pixels need to be averaged.
4. The final black clamp value can be digitally adjusted by changing the magnitude of comparator thresholds, or the transfer function in the look up table. This provides the additional advantage of not truncating the black field, (clipping the valleys in the black image) and providing numerical under range for down stream digital image processing.
5. This solution can be designed digitally.
6. This invention can be made to operate as a frame rate clamp and a line rate clamp.
7. This invention can be integrated with a CMOS Imager.
8. This invention can have multiple attack times (loop response times). If the actual image black level is significantly different than the invention black level, the invention rapidly approaches the desired black level in coarse quantization steps. As the desired black level is approached this invention can slow down, with fine quantization steps. This condition occurs, for example, when the first picture is captured with an electronic camera, after power on.
9. This invention uses two, or more digital comparators to provide a hysteresis to prevent the loop from hunting. This has the advantage of allowing multiple pictures, taken in sequence, to have the same black level. A varying black level, in a sequence of images, is objectionable.

DETAILED DESCRIPTION OF THE INVENTION

In the following description, the present invention will be described in the preferred embodiment as a hardware circuit.

The present invention utilizes a digital average value circuit to calculate the average value of a group of black pixels. The average value is then used in a real time feedback loop that removes offset errors in the signal processing chain and establishes the correct black level in the output image data. The feedback can be either digital or analog.

The present invention removes the residual errors previously mentioned. An additional benefit of the present invention is to relieve performance requirements on the first stage black clamp. Instead of clamping too exactly at the "0" of the Programmable Gain Amplifier (PGA), the first stage clamp just needs to get "close enough to 0." The present invention is used to remove all the offset errors up to and including that of the analog-to-digital converter.

This invention is intended for, but not restricted to, use as a second stage black clamp in a solid-state imager electronic camera system signal processing chain. It can be implemented in an integrated form as part of a CMOS imager. It can also be implemented as part of an integrated circuit intended for processing the raw video signal from an external imager. It is also possible to construct this invention using discrete components for use with CCD and CMOS Imager imaging systems.

Typically, digital systems commonly operate in the binary number system. However, for convenience of this description, decimal numbers will be used in the majority of this discussion.

Figure 1:
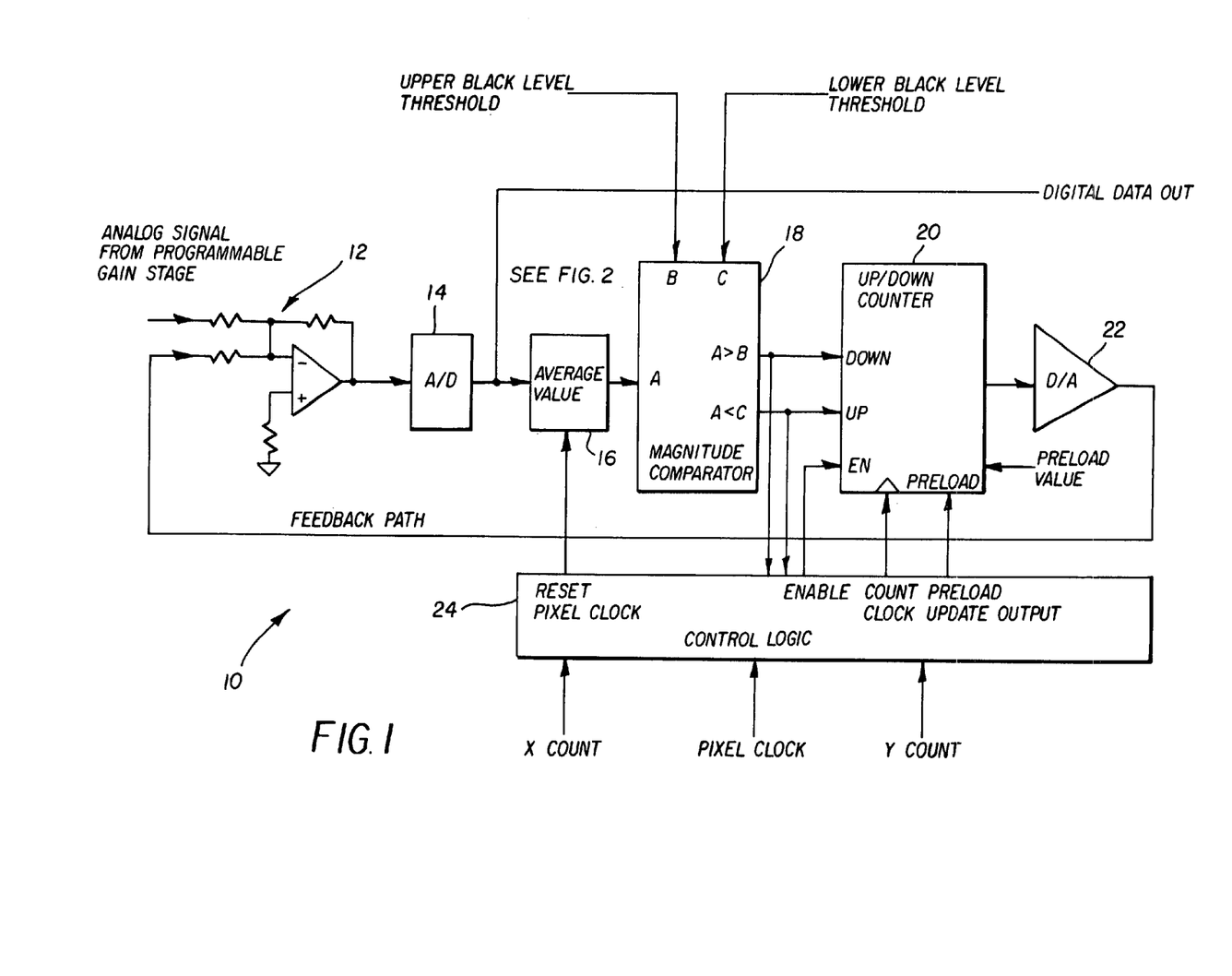
FIG. 1 illustrates an feedback embodiment of the present invention that utilizes a magnitude comparator and up/down counter to derive the value to be digital to analog converted to the analog feedback signal and subtracted from the incoming video.

A preferred embodiment of a second stage black clamp circuit 10 includes several sections, as depicted in FIG. 1. A first section includes a analog summing junction 12 that receives the analog signal over an input from the prior programmable gain amplifier (PGA) stage. This summing junction 12 is the feedback node in the invention and receives the clamped fed back black level signal. The corrected black value derived in accordance with the present invention, to be added (or subtracted) to (from) the analog video, is combined at this summing junction 12 with the imager pixels.

The output of the summing junction 12 is an input to an analog-to-digital (A/D) converter 14 of a second section.

The A/D converter 14 converts the analog pixel signal to digital form. These digital values are used to create the actual image and so are output to the image processing components of the camera. The digital values (including the corrected black level) are also provided as input to later sections of the invention.

The third section includes a digital average value circuit 16. The digital average value circuit 16 calculates an average value of a group of black pixels. The average value circuit 16 is essentially an adder/accumulator with a left shift to provide the divide function.

Figure 2:
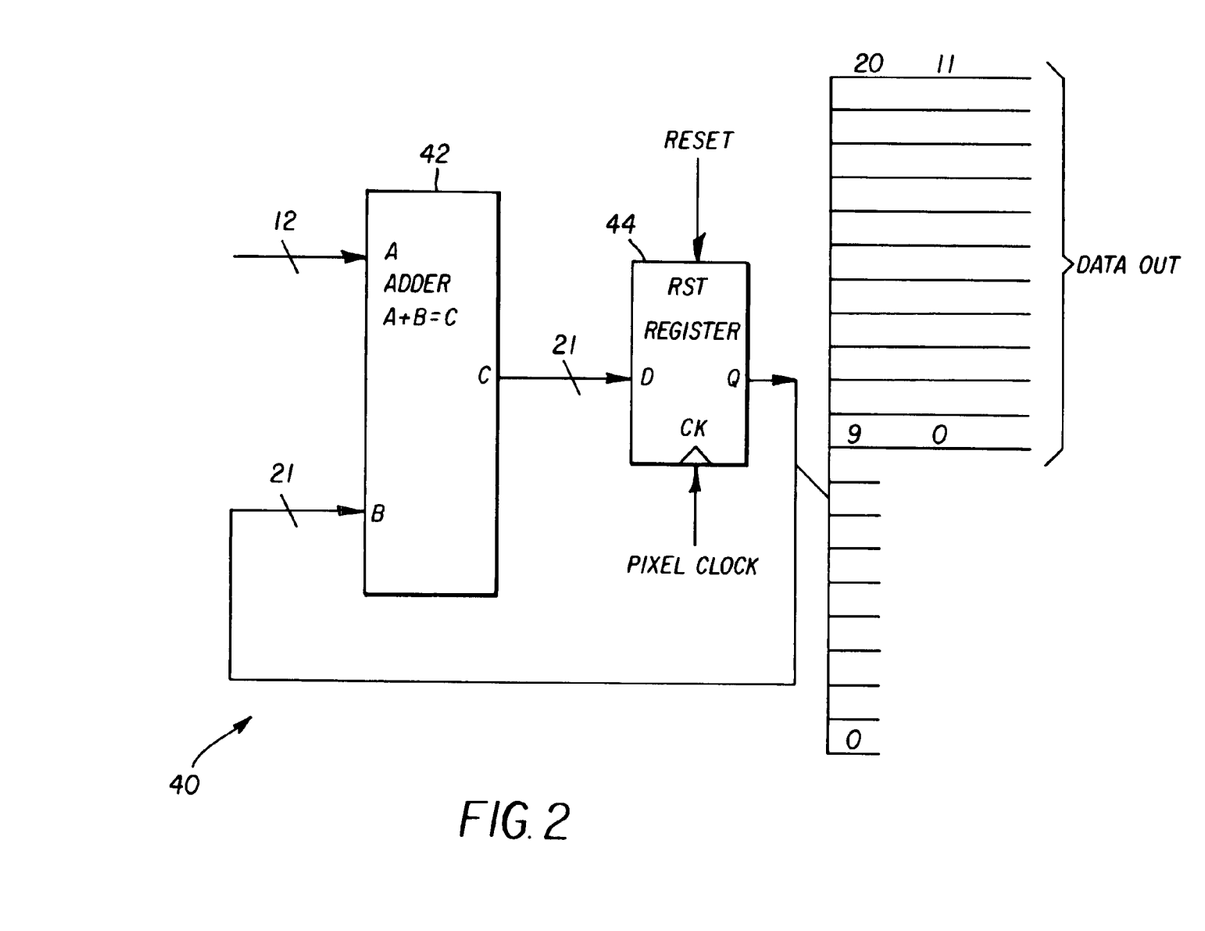
FIG. 2 depicts the details of an average value circuit of FIG. 1.

The adder/accumulator 40, as depicted in FIG. 2, is preferably implemented using a 2-port adder 42 with a resetable data register 44 at the output of the adder 42. The output of the data register 44 is connected to the B port of the adder 42. The output of the average value circuit 16 comprises the most significant bits (preferably 12) of the register 44 (essentially a left shift as discussed below). An example of how to implement the adder portion of this circuit can be found in application note AN8007 (Lattice Semiconductor Corp., Hillsboro, Oreg.).

A bit depth of the adder/accumulator is determined by the total quantity of black pixels that the clamp circuit designer desires to accumulate (and average), multiplied by the maximum possible value for each pixel. For example, if the desired system has 12 bit pixels (12 bit A/D), and the total quantity of pixels that the designer decides to average is 512, then the maximum number that the adder/accumulator has to accumulate is: 4095×512=2,096,640. 2,096,640 is a 21 bit binary number. In this example, the A input port of the adder is 12 bits wide, the output and the B port of the adder are 21 bits wide. The adder output is 21 bits wide and is connected to a 21-bit register 44. Connecting the output of the register 44 to the B port of the adder 42 makes this design an adder/accumulator. If, as is preferred, the quantity of pixels to be averaged is constrained to an integer power of 2 ($2^N$, where N is the pixel quantity), then a divide function (or average function in this case) can be realized by "left shifting" the output data N bits. In this example N is 9 ($2^9$=512). This wiring based left shift to accomplish a divide has the advantage of requiring no silicon and no time penalty. The add, accumulate, shift (divide) operations form the average of the accumulated pixel values. The actual output of the average value circuit 16 is a 12-bit number that is the average of 512 values that have been added together (accumulated) and then divided by 512 ($2^9$).

A text based example of the output data shift is set forth below.

threshold, B, and a lower threshold, C, or below a lower threshold, C. These thresholds represent the desired range for the output black level. As an example, assume that the comparator 18 is set with an upper threshold, B, of 55, set with a lower threshold, C, of 45 and the average value of the black pixels is provided to the A input port of the comparator 18. If the average value of the black pixels from the average value circuit 16 is greater than 55, inclusive, then A>B output is true. If the average value of the black pixels is less than 45 then A<C is true. If the average value of the black pixels is between 45 and 55 then both A>B and A<C are false. This 45 to 55 range forms a "dead zone" or hysteresis function so the feed back loop does not "hunt" or oscillate.

The outputs of the magnitude comparator 18 are connected to an up/down counter 20. The up/down counter 20 produces a digital black level value provided to a digital-to-analog (D/A) converter 22. The counter 20 counts down when the average value of the black pixels is too high and counter 20 counts up when the average value of the black pixels is too low. This behavior essentially forms the inversion of the black pixel error that the feedback loop requires. The output of the up/down counter 20 is connected to the D/A converter 22 whose output is provided to the feedback input of the summing junction 12.

Conventional control logic 24 manages the operation of the feedback loop. It is preferably conventional state machine type logic that uses pixel counter data and line counter data that exist in imaging system, as well as the comparison data from the comparator 18, to step through the states of the state machine and/or dedicated logic to perform the functions described below. At the beginning of the black feedback loop operation (for example, at the top of, or first row of pixels of a picture) the control logic 24 resets the register 44. The control logic 24 also pre-loads a default black level value into the up/down counter 20 that is "close" to the desired black value. This pre-load is done to improve the overall system response time.

Based on the X and Y pixel addresses inputs, the control logic creates a "Black Window" signal that signifies the 512 black pixels to be averaged. For example, at line address Y0, pixel address X10, Black Window is asserted true. This Window is used to select the group of pixels to be averaged. It is desirable to select a subset of available black pixels to form the average. This allows time for the feedback loop to settle. At line address Y0, pixel address X522 Black Window is de-asserted or made false. This address is chosen such that the quantity of black pixels included in the black window is 512. This matches the $2^9$ or 512 quantity of the preferred

```
   Input Port A (12 bits)        Input Port B (21 bits)
MSB          LSB            MSB                   LSB
  XXXXXXXXXXXX              XXXXXXXXXXXXXXXXXXXXX Output Port (12 bits, 21 bits internally)
MSB        LSB
 XXXXXXXXXXXXXXXXXXXXX Output DATA,     |-------------------| bits not used external to the adder
accumulator
 XXXXXXXXXXXX 12 bits left shifted 9 places
```

As depicted in FIG. 1, the section after the average value circuit 16 includes a magnitude comparator 18 used to determine whether the average black value is within a desired range. The comparator 18 determines if the average value of the black pixels produced by the average value circuit 16 is above an upper threshold, B, between an upper left shift operation, for the divide function. During the Black Window true period, the register 44, at the output of the adder/accumulator, is clocked by the pixel clock. The average value circuit 16 contains the correct average value at its' output after Black Window is de-asserted or at the end of the true period. This correct average value is connected to the magnitude comparator 18. This operation can be conducted multiple times in one image capture. Typically, imagers have multiple black lines at the top of the image to facilitate this operation. The only restriction is that the feedback loop must be settled prior to another black clamp averaging operation. When the camera captures the next image, the cycle starts again.

The results produced by the magnitude comparator 18 are continuously presented to the up/down counter 20. After Black Window is de-asserted, the control logic 24 then enables one count cycle of the counter 20 based on the output of the comparator 18. The analog equivalent of the counter contents, which is the black offset correction signal, is sent to the summing junction 12 from the D/A converter 22. The control logic 24 allows enough time for the analog portion of the feedback loop to settle. This process is then repeated for the next group of black pixels to be clamped.

Figure 3:
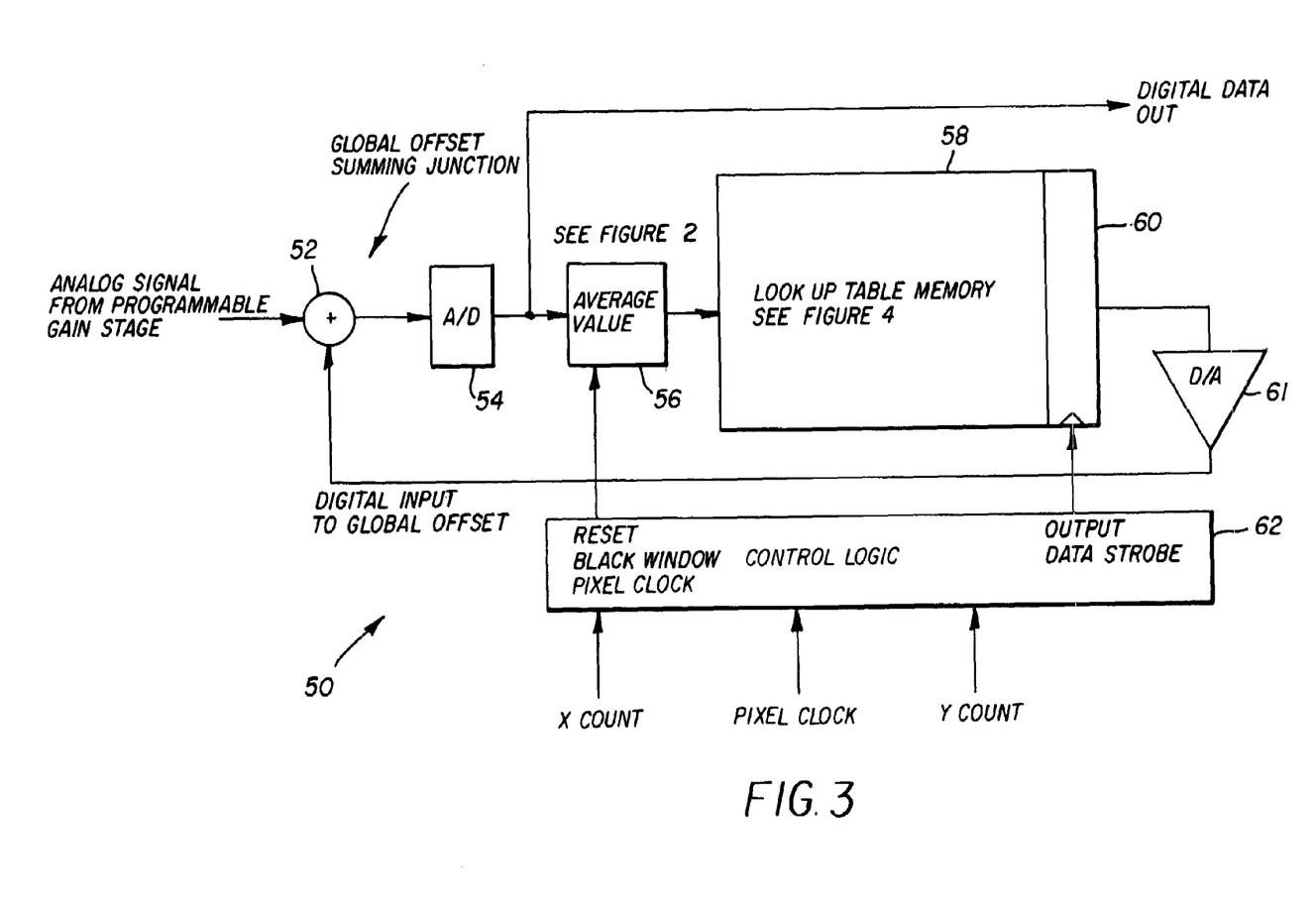
FIG. 3 illustrates a feedback embodiment of the present invention that utilizes a look up table to derive the value to be digital to analog converted to the analog feedback signal and added to the incoming video where the required negative feedback is established with the slope of the transfer function contained in the look up table.

A second preferred embodiment of a black clamp circuit 50 also includes several sections, as depicted in FIG. 3. This embodiment is similar to the embodiment of FIG. 1; however, a digital Look-Up memory (Table) replaces the magnitude comparator 18 and the up/down counter 22.

A first section includes an analog-to-digital converter 54 that receives the analog signal over an input from the prior programmable gain amplifier (PGA) stage. The analog-to-digital converter 54 is connected to the global offset summing junction 52. This summing junction 52 is the feedback node in the invention and receives the clamped fed back black level signal. The corrected black value derived in accordance with the present invention, to be added (or subtracted) to (from) the digital video, is combined at this summing junction 52 with the imager pixels. Typically, this summing junction is implemented using a 2 port digital adder.

The output of the summing junction 54 is connected to the third section, a digital average value circuit 56. The digital average value circuit 56 calculates an average value of a group of black pixels. The average value circuit 56 is essentially an adder/accumulator with a left shift to provide the divide function.

A fourth section includes a look-up-table (LUT) that performs the functions of the comparator and counter. It also provides the inversion necessary to stabilize the feedback loop. The output of the average value circuit 56 is connected to a look-up table (LUT) memory 58. This memory 58 can be implemented as Read Only Memory (ROM), Programmable Read Only Memory (PROM) or Random Access Memory (RAM). The memory 58 has a data storage register 60 connected to its' output. The LUT memory 58 is constructed such that the data bits from the average value circuit 56 are connected to the address lines of the memory 58. For the 12-bit pixel example previously discussed, the memory has 12 address lines connected to the circuit 56. The memory size is therefore 4096 locations of N bits per word. The word size is dependent on the quantization precision needed for the feedback signal and the desired black signal dynamic range. A typical precision is one least significant bit of the A/D converter output.

Figure 4:
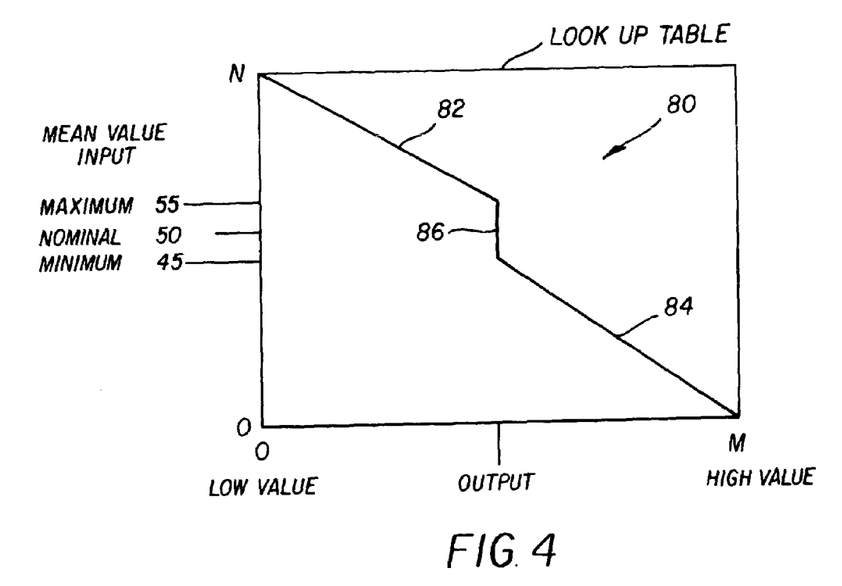
FIG. 4 shows a transfer function suitable for the embodiment of FIG. 3.

The memory 58 essentially stores a transfer function that converts an average value into a corrected black level value that corrects for errors. A possible stored transfer function 80 is depicted in FIG. 4 that results in behavior similar to the behavior of the black clamp preferred embodiment previously discussed. As the average value of a group of black pixels increases, such as along correction rate segment 82, the value output from the LUT 58 decreases at a correction slope. As the average value of a group of black pixels decreases, such as along correction segment 84, the value output from the LUT memory 58 increases at a correction slope. This forms the inversion of the feedback loop. The illustrated function includes a "dead zone" function segment 86 centered at a 50-value code. This dead zone or hysteresis is provided so the feed back loop does not "hunt" or oscillate. The feedback loop will settle at a black value of 45 to 55.

The output of the look-up table memory 58 is connected to the summing junction 52 through the output register 60 and a digital-to-analog converter 61.

Control logic 62 of FIG. 3 is used to manage the operation of the feedback loop similar to that provided in the discussion above with respect to the analog embodiment. At the beginning of the black feedback loop operation the control logic 62 resets the register at the output of the average value circuit 56. Based on the X and Y pixel address inputs, the control 62 creates a "Black Window" signal that signifies (in the example discussed herein) the 512 black pixels to be averaged. The average value circuit 56 contains the correct average value after Black Window ends.

The black pixel average value at the end of the Window is applied to the LUT 58. The LUT 58 provides a corrected or reference black value to be fed back to the summing junction 52. The register 60 at the output of the LUT memory 58 is clocked once after the memory access time has expired (and Black Window period ends). This new feedback value is presented to the summing junction 52.

Figure 5:
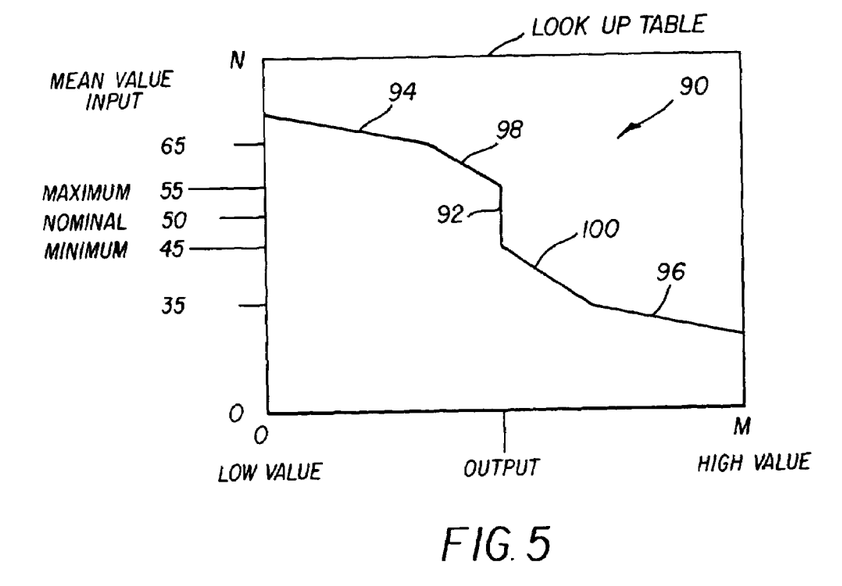
FIG. 5 shows another transfer function suitable for the embodiment of FIG. 3.

The first analog feedback embodiment can have a multiple magnitude comparator or a pair of comparators, respectively. Such a comparator(s) detects whether A>>B, A>B, A<<C, A<C. As the thresholds are exceeded, the up/down counter 20 is clocked more than once per feedback loop cycle for the much-greater-than detections and just once for the greater-than detections. This gives the feedback a dual "attack" time or correction speed. If the black level is way off or has a high error (for example, A>>B or A<<C), the system corrects rapidly, such as clocking the correction two or more times per feedback cycle, until A>B or A<C is reached. Then, the loop correction "slows down" and is clocked once per feedback loop cycle. This will make the loop settle to the correct black value faster. An example of a look up table digital transfer function 90 that accomplishes the dual speed correction is depicted in FIG. 5.

The higher speed correction occurs when the input count is above 65 or below 35 in correction rate segments 94 and 96, which has a higher slope, the slower speed correction occurs between counts 55-65 and 35-45 in segments 98 and 100 where the slope is lower and hysteresis occurs in region 92.

Figure 6:
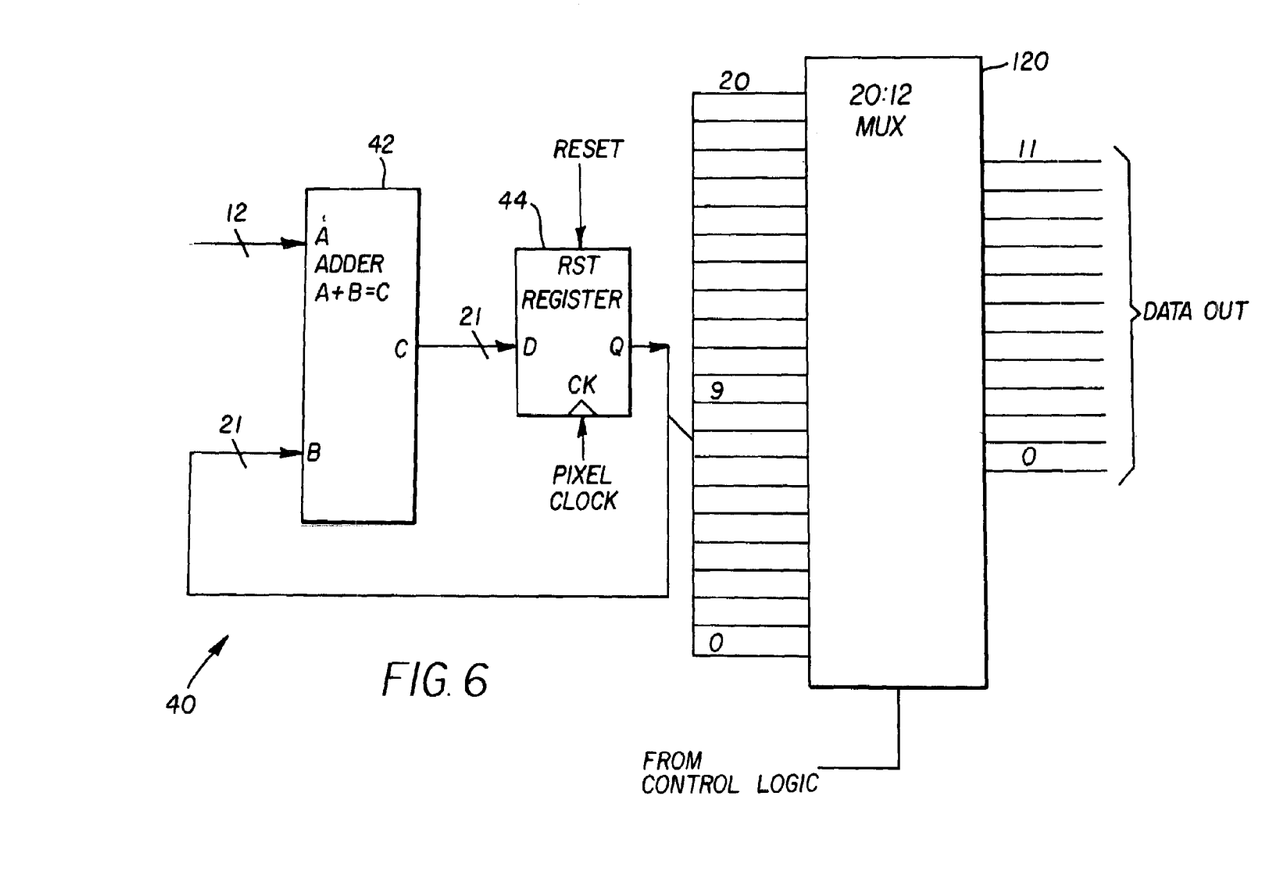
FIG. 6 depicts a multiplexer allowing the number of bits used to be selectively changed.

In the discussion above the number of black pixels to be averaged is fixed. However, the quantity of black pixels to be averaged does not have to be fixed. The number is preferably constrained to be an integer quantity of N where N=2^N, so that division by "shifting" can be used to obtain the average. A multiplexer 120 can be placed after the average value circuit, as depicted in FIG. 6, to accomplish output data steering or selective shifting responsive to the number of pixels to be averaged. Instead of the shift being hardwired, the multiplexer 120 allows a dynamic shifting operation where the control logic controls the multiplexer data selection. For example, if the system is averaging 512 pixels, the output data line for bit 0 is connected to the input data line for bit 9, in a likewise fashion the ascending data-out bits are connected to the ascending multiplexer data-in bits. Data-out bit 11 is connected to multiplexer data-in bit 20. The chart below illustrates the function of the multiplexer 120 where DO indicates data out (DO) bits.

| Mux data In Bits | Avg. 512 DO Bits | Avg. 256 DO Bits | Avg. 128 DO Bits | Avg. 64 DO Bits | Avg. 32 DO Bits | Avg. 16 DO Bits | Avg. 8 DO Bits | Avg. 4 DO Bits | Avg. 2 DO Bits |
|---|---|---|---|---|---|---|---|---|---|
| 20 | 11 | | | | | | | | |
| 19 | 10 | 11 | | | | | | | |
| 18 | 9 | 10 | 11 | | | | | | |
| 17 | 8 | 9 | 10 | 11 | | | | | |
| 16 | 7 | 8 | 9 | 10 | 11 | | | | |
| 15 | 6 | 7 | 8 | 9 | 10 | 11 | | | |
| 14 | 5 | 6 | 7 | 8 | 9 | 10 | 11 | | |
| 13 | 4 | 5 | 6 | 7 | 8 | 9 | 10 | 11 | |
| 12 | 3 | 4 | 5 | 6 | 7 | 8 | 9 | 10 | 11 |
| 11 | 2 | 3 | 4 | 5 | 6 | 7 | 8 | 9 | 10 |
| 10 | 1 | 2 | 3 | 4 | 5 | 6 | 7 | 8 | 9 |
| 9 | 0 | 1 | 2 | 3 | 4 | 5 | 6 | 7 | 8 |
| 8 | | 0 | 1 | 2 | 3 | 4 | 5 | 6 | 7 |
| 7 | | | 0 | 1 | 2 | 3 | 4 | 5 | 6 |
| 6 | | | | 0 | 1 | 2 | 3 | 4 | 5 |
| 5 | | | | | 0 | 1 | 2 | 3 | 4 |
| 4 | | | | | | 0 | 1 | 2 | 3 |
| 3 | | | | | | | 0 | 1 | 2 |
| 2 | | | | | | | | 0 | 1 |
| 1 | | | | | | | | | 0 |
| 0 | | | | | | | | | |

The present invention can also be utilized in a dynamic fashion. By using the pixels at the beginning of the image, a frame rate black clamp can be established at the top of each picture/image. The Black Window signal can then be set to window the black pixels at the beginning and at the end of each line. A line rate black clamp is now in operation. The frame black value is established by the black clamp at the top of the image. In the first embodiment, the black level is latched by the up/down counter. As the line rate clamp operates, the black level is adjusted by driving the up/down counter. So the black level is established at the top of the image, and then modified by the line rate clamp.

The D/A could be used to establish the voltage reference for the A/D, then the analog summing junction "goes away". Thus one part can do two jobs.

The present invention is scaleable. That is, we can increase the number of pixels to be averaged in a binary fashion by adding more bits to the averaging circuit.

The present invention could also be used for a full black clamp where the digital feedback averaged, etc. and then connected to a summing junction at the input of the PGA.

The invention has been described with reference to a preferred embodiment. However, it will be appreciated that variations and modifications can be effected by a person of ordinary skill in the art without departing from the scope of the invention.

PARTS LIST 10, 50 black clamp circuit
12, 52 summing junction
14, 54 A/D circuit
16, 40, 56 average value circuit
18 magnitude comparator
20 up/down counter
22, 61 D/A circuit
24, 62 control logic
42 adder
44, 60 register
58 look-up table memory
80, 90 transfer function
82, 44, 86,
92, 94. 96,
98 100 correction rate segments
120 multiplexer

What is claimed is:

1. A black clamp circuit for an electronic imager having black reference pixels, said circuit comprising:
   an input receiving the black reference pixels;
   an analog to digital converter outputting image pixels;
   an average value circuit coupled to said analog to digital converter and determining an average of a number of the black reference pixels, wherein said average value circuit comprises:
      an average value register outputting the average value as a group of the most significant bits of contents of the register; and
      a two port adder having a first port and having a second port coupled to said average value register, and adding input black reference pixels from said input to contents of said register, forming an adder accumulator with a group of the most significant bits of contents of the register;
   a level correction circuit coupled to said average value circuit and determining a black level from the average;
   a digital to analog circuit coupled to said level correction circuit; and
   a summing circuit coupled to said input and said digital to analog circuit, and summing the black level and image pixels.

2. A black clamp circuit as recited in claim 1, wherein said level correction circuit comprises:
   a magnitude comparator coupled to the average value circuit and producing count signals; and
   an up/down counter coupled to the said comparator and said summing circuit, and counting responsive to the counts signals.

3. A black clamp circuit as recited in claim 2, wherein said comparator compares the average value to first and second black level thresholds and produces a count signal when the black level is less than to equal to the second threshold and produces a down count signal when the black level is greater than or equal to the first threshold.

4. A black clamp circuit as recited in claim 3, wherein said comparator compares the average value to third and fourth black level thresholds and produces more than one up count signal when the black level is less than to equal to the fourth threshold and produces more than one down count signal when the black level is greater than or equal to the third threshold.

5. A black clamp circuit as recited in claim 2, wherein said counter is preloaded with a default black level.

6. A black clamp circuit as recited in claim 5, further comprising control logic coupled to said average value circuit and said counter, resetting said register for feedback loop operation, preloading the black level and opening/closing an correction determination window responsive to pixel addresses with the correction being output by said counter when the window is closed.

7. A black clamp circuit as recited in claim 1, wherein said level correction circuit comprises a look up table memory coupled to said average value circuit and said summing circuit, and producing the black level.

8. A black clamp circuit as recited in claim 7, wherein the memory stores a transfer function table producing the correction responsive to the average value.

9. A black clamp circuit as recited in claim 8, wherein the transfer function includes a hysteresis segment and a correction segment with a first slope of correction versus input values.

10. A black clamp circuit as recited in claim 9, wherein the correction segment has a second slope of correction versus input values providing a correction rate higher than the black level rate of the first slope.

11. A black clamp circuit as recited in claim 1, wherein the black level is a digital value.

12. A black clamp circuit as recited in claim 1, wherein said level correction circuit further comprises a correction register coupled to said memory and said summing circuit, and storing the black level.

13. A black clamp circuit as recited in claim 12, further comprising control logic coupled to said average value circuit and said correction register, resetting said average value register for feedback loop operation, opening/closing a correction determination window responsive to pixel addresses and clocking the correction register at the closing of the window.

14. A black clamp circuit as recited in claim 1, wherein the number of pixels used in the average is variable.

15. A black clamp circuit as recited in claim 2, wherein said magnitude comparator comprises a first comparator comparing A>B and A<B producing a single count signal for each true comparison.

16. A black clamp circuit as recited in claim 15, wherein said magnitude comparator comprises a second comparator comparing A>>B and A<<B and producing a pair of count signals for each true comparison.

17. A black clamp circuit as recited in claim 1, wherein the black reference pixels are pixels for a frame.

18. A black clamp circuit as recited in claim 1, wherein the black reference pixels are pixels for a line.

19. A black clamp circuit for an electronic imager having black reference pixels, said circuit comprising:
   an input receiving the black reference pixels;
   an analog-to-digital converter outputting image pixels;
   an average value circuit coupled to said analog-to-digital converter and determining an average of a number of the black reference pixels, said average value circuit comprising:
      an average value register outputting the average value as a group of the most significant bits of contents of the register; and
      a two port adder having a first port and having a second port coupled to said average value register, and adding input black reference pixels from said input to contents of said register, forming an adder accumulator;
   a level correction circuit coupled to said average value circuit and determining a black level from the average, said level correction circuit comprising:
      a magnitude comparator coupled to said average value circuit and producing count signals, said comparator comparing the average value to first and second black level thresholds and producing a count signal when the black level is less than or equal to the second threshold and producing a down count signal when the black level is greater than or equal to the first threshold and comparing the average value to third and fourth black level thresholds and producing more than one up count signal when the black level is less than or equal to the fourth threshold and producing more than one down count signal when the black level is greater than or equal to the third threshold; and
      an up/down counter coupled to the said comparator and said summing circuit, and counting responsive to the counts signals and preloaded with a default black level;
   a digital-to-analog circuit coupled to said counter of said level correction circuit;
   a summing circuit coupled to said input, said digital-to-analog circuit and said first port of said two port adder, and summing the black level and image pixels; and
   control logic coupled to said average value circuit and said counter, resetting said register for feedback loop operation, preloading the black level and opening/closing an correction determination window responsive to pixel addresses with the correction being output by said counter when the window is closed.

* * * * *